United States Patent [19]

Sheerer

[11] 4,087,917
[45] May 9, 1978

[54] POSITIVELY POSITIONABLE RULER

[76] Inventor: Marley Sheerer, 15 Downing St., Plymouth, Pa. 18651

[21] Appl. No.: 711,116

[22] Filed: Aug. 3, 1976

[51] Int. Cl.² .............................................. B43L 7/00
[52] U.S. Cl. ................................................. 33/107 R
[58] Field of Search .................. 33/107, 108, 109, 104

[56] References Cited

U.S. PATENT DOCUMENTS

| 1,343,968 | 6/1920 | Hahn | 33/107 R |
| 1,594,822 | 8/1926 | Elam | 33/104 |

FOREIGN PATENT DOCUMENTS

| 250,826 | 11/1966 | Austria | 33/104 |

Primary Examiner—Richard J. Aegerter
Assistant Examiner—John W. Shepperd
Attorney, Agent, or Firm—J. Rodman Steele, Jr.

[57] ABSTRACT

A positively positionable ruler including an elongated body member having suitable measurement indicia thereon and a plurality of apertures therethrough, a plurality of surface engaging elements adapted to be slideably disposed within the plurality of apertures, the upper surface of the surface engaging elements for engaging the user's fingers and the lower surface thereof for engaging a supporting surface, and means for slideably affixing the surface engaging element within the apertures.

3 Claims, 3 Drawing Figures

POSITIVELY POSITIONABLE RULER

BACKGROUND OF THE INVENTION

Field of the Invention

The present invention relates to rulers, and more particularly to a ruler which positively engages the surface to be ruled to prevent slippage thereon.

Description of the Prior Art

Rulers must be held securely in place when used as a guide for drawing or cutting to maximize their effectiveness. Presently, various means are used to prevent the slippage of rulers between both the user's hand and the ruler, and the ruler and the material to be ruled. Rulers are provided with various materials fixedly secured to the lower surfaces thereof, such as rubber, cork, or similar friction inducing compositions. Upper surfaces of rulers are provided with variously configured endulations, and roughened surfaces to prevent slippage of the user's fingers when placed thereon.

Currently available rulers have proven to be inadequate especially when used in conjunction with photographic papers and other slick surfaced materials. Further problems are incurred if the user is required to wear protective gloves.

The present invention overcomes the problems associated with the prior art by providing a ruler which may be positively positioned with little chance of undesirable slippage.

SUMMARY OF THE INVENTION

Therefore, it is a primary object of the present invention to provide a ruler which may be positively positioned with little chance of unwanted slippage.

A further object is to provide a positively positionable ruler which may be maintained securely in a selected position with relatively small amounts of finger pressure by the user.

Another object is to provide a positively positionable ruler which is simple in design, inexpensive to manufacture, and durable.

These objects, as well as further objects and advantages, of the present invention will become readily apparent after reading the description of a non-limiting illustrative embodiment and the accompanying drawing.

According to the principles of the present invention there is provided a positively positionable ruler which includes an elongated body member having a substantially flat lower surface for contacting a supporting surface, the body member having a plurality of apertures located therein opening through the upper and the lower surfaces of the body member, the upper surface of the body member having suitable indicia thereon; a plurality of surface engaging elements each adapted to be slideably disposed within one of the apertures, the upper surface of the elements adapted to engage a portion of a human hand, the lower surface of each of the elements resting on the supporting surface when the lower surface of the body member is thereadjacent; and means for slideable affixing the plurality of surface engaging elements within the apertures.

BRIEF DESCRIPTION OF THE DRAWINGS

In order that the present invention may be more fully understood it will now be described, by way of example, with reference to the accompanying drawings in which.

DETAILED DESCRIPTION OF THE PREFERRED EMBODIMENT

Figure 1:
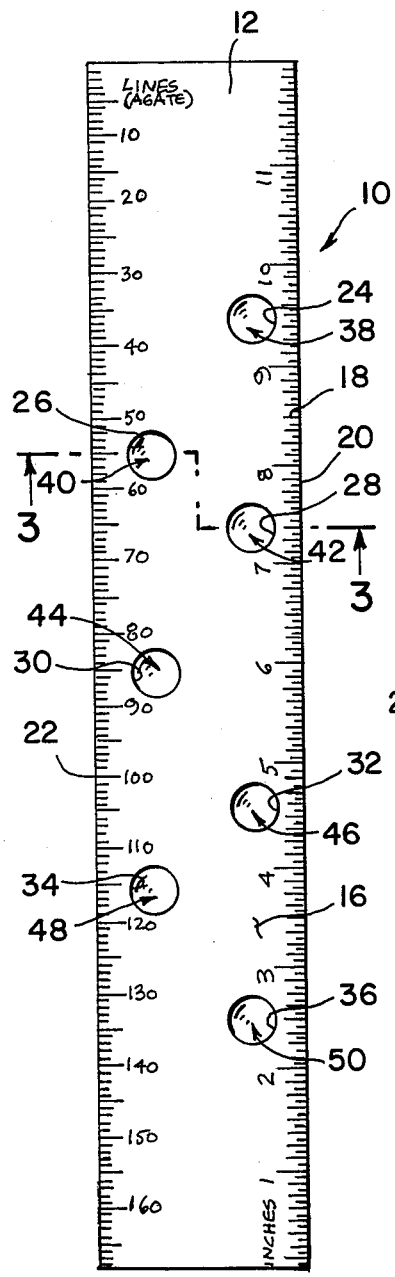
FIG. 1 is a top plan view of the preferred embodiment incorporating the principles of the present invention.

Referring now to the figures, and more particularly to FIG. 1, thre is illustrated therein a positively positionable ruler 10. The ruler 10 includes an elongated body member 12 having a substantially flat lower surface 14, not shown, for contacting a supporting surface. The upper surface 16 of the body member 12 includes suitable measurement indicia 18 such as the inch or fraction of an inch markings adjacent to the edge 20 of the body member 12, and agate markings along the edge 22 thereof.

Figure 3:
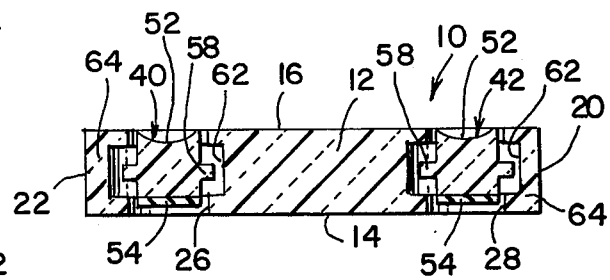
FIG. 3 is a sectional view of the body member of FIG. 1 taken substantially along the lines 3—3 thereof.

A plurality of apertures 24, 26, 28, 30, 32, 34, 36, are located in the body member 12 and open through the lower surface 14 and the upper surface 16 thereof as shown in FIG. 3. A plurality of surface engaging elements 38, 40, 42, 44, 46, 48, 50 are slideably disposed respectively within the apertures 24, 26, 28, 30, 32, 34, 36. The body member 12 is preferably constructed of a transparent material such as lucite or the like. The indicia 18 may be printed on or engraved in the upper surface 16. The edges 20 and 22 may also be provided with inserts of aluminum or the like if the ruler 10 is to be used as a cutting guide.

Figure 2:
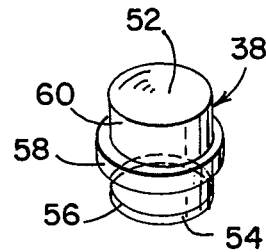
FIG. 2 is a perspective side view of a surface engaging element.

FIG. 2 illustrates the surface engaging element 38 and is typical of the surface engaging elements 40, 42, 44, 46, 48, 50. The surface engaging element 38 is preferably cylindrical in shape as shown. The upper surface 52 of the surface engaging element 38 is concave in shape to prevent the fingertips of the user from sliding thereoff when placed thereon. A semi-resilient pad 54 is fixedly secured to the lower surface 56 of the element 38. An annular ridge 58 is provided on the lateral walls 60 of the surface engaging element. The pad 54 may be constructed of latex rubber or the like.

FIG. 3 illustrates the surface engaging elements 40 and 42 slideably disposed respectively within the apertures 26 and 28, and is also typical of the placement of the surface engaging elements 38, 44, 46, 48, and 50. An annular groove 62 is located in the walls 64 of the body member 12 forming each of the apertures 26 and 28. The groove 62 is dimensioned to capture and slideably retain therein the corresponding annular ridge 58. As a result, the surface engaging elements can travel in a path substantially normal to the lower surface 14 of the body member 12.

In use, the ruler 10 is placed on the material to be ruled. The user then places his fingertips on the concave upper surfaces of a desired member of surface engaging elements and applies downward pressure. The semi-resilient pads 54 engage the material to be ruled thereby locking the ruler 10 in position. The positioning of the apertures and surface engaging elements into an alternating pattern of two rows, adjacent each elongated edge of the ruler, as shown in FIG. 1, permits the ruler to be positioned without bending one's fingers in an uncomfortable position with respect to their natural curvature. It has been found, for example, that a left handed user, for best results, should place fingertips on the surface engaging elements 38, 42, and 48 and a right handed user on surface engaging elements 40, 44, 48.

It will be understood that various changes in the details, materials, arrangements of parts and operation conditions which have been herein described and illustrated in order to explain the nature of the invention may be made by those skilled in the art within the principles and scope of the invention.

I claim:

1. A positively positionable ruler comprising:

an elongated body member having a substantially flat lower surface for contacting a supporting surface and a substantially flat upper surface for marking indicia thereon, said body member having a plurality of cylindrical apertures located therein opening through said lower surface and said upper surface of said body member, said apertures forming an alternating pattern along two rows which run substantially parallel to the elongated axis of the body member, each of said apertures having a centrally located annular groove; and, a plurality of cylindrical surface engaging elements, each of said elements having a centrally located annular ridge, thereby permitting each of said elements to be slideably disposed and retained within each of said apertures, said ridges resting in said grooves, the upper surface of said elements adapted to engage the fingers of a human hand, and a semi-resilient pad secured to the lower surface of each of said elements for frictionally engaging said supporting surface, thereby permitting one using said ruler to comfortably and positively position said ruler on said supporting surface by the naturally curved fingers of either hand.

2. A positively positionable ruler according to claim 1, wherein said suitable indicia comprises inch and fraction of inches markings adjacent one of said elongated edges of said body member, and agate markings along the other of said elongated edges thereof.

3. A positively positionable ruler according to claim 1, wherein said upper surface of said surface engaging elements are concave in shape.

* * * * *